(12) United States Patent
Holland et al.

(10) Patent No.: US 7,397,774 B1
(45) Date of Patent: Jul. 8, 2008

(54) DOWNLINK DATA MULTIPLEXER

(75) Inventors: S. Douglas Holland, Houston, TX (US);
Glen F. Steele, Webster, TX (US);
Denise M. Romero, Houston, TX (US);
Robert David Koudelka, Silver Spring, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 969 days.

(21) Appl. No.: 10/446,283

(22) Filed: May 23, 2003

(51) Int. Cl.
*H04J 3/08* (2006.01)
(52) U.S. Cl. ...................... 370/326; 370/346
(58) Field of Classification Search ............... None
See application file for complete search history.

(56) References Cited

U.S. PATENT DOCUMENTS

| | | | |
|---|---|---|---|
| 4,567,591 A * | 1/1986 | Gray et al. .................. 370/326 |
| 4,914,650 A | 4/1990 | Sriram |
| 5,216,503 A | 6/1993 | Paik et al. |
| 5,406,558 A * | 4/1995 | Rovira et al. ................ 370/326 |
| 5,461,619 A | 10/1995 | Citta et al. |
| 5,500,676 A | 3/1996 | Tanaka et al. |
| 5,506,844 A | 4/1996 | Rao |
| 5,675,575 A * | 10/1997 | Wall et al. .................... 370/326 |
| 5,689,568 A * | 11/1997 | Laborde ..................... 713/151 |
| 5,712,850 A * | 1/1998 | Elia et al. .................... 370/326 |
| 5,742,601 A | 4/1998 | Riedel |
| 5,867,490 A * | 2/1999 | Campanella ................ 370/326 |
| 6,055,244 A * | 4/2000 | Wall et al. .................... 370/487 |
| 6,134,225 A * | 10/2000 | Pham et al. ................. 370/316 |
| 6,151,333 A | 11/2000 | Arimilli et al. |
| 6,178,470 B1 * | 1/2001 | Dowling ..................... 710/52 |
| 6,219,349 B1 | 4/2001 | Kobayashi et al. |
| 6,219,359 B1 | 4/2001 | Budge et al. |
| 6,240,074 B1 * | 5/2001 | Chandos et al. ............. 370/321 |
| 6,243,707 B1 * | 6/2001 | Humpleman et al. ........ 707/102 |
| 6,275,502 B1 | 8/2001 | Arimilli |
| 6,301,250 B1 | 10/2001 | Schmitz |
| 6,404,738 B1 | 6/2002 | Reininger et al. |
| 6,711,182 B1 * | 3/2004 | Gibbs et al. ................. 370/537 |
| 7,106,697 B1 * | 9/2006 | Best et al. .................... 370/231 |
| 7,133,377 B1 * | 11/2006 | Mullins et al. .............. 370/321 |
| 7,145,910 B2 * | 12/2006 | Parruck et al. ............. 370/395.1 |
| 2002/0126700 A1 * | 9/2002 | Rokugo ...................... 370/469 |
| 2002/0146023 A1 * | 10/2002 | Myers ........................ 370/412 |
| 2003/0095551 A1 * | 5/2003 | Gotoh et al. ............. 370/395.3 |

(Continued)

OTHER PUBLICATIONS

"Image data compression", CCSDS 122.0-B-1, p. 1-1 1.2 second paragraph, Blue book, Nov. 2005.*

(Continued)

*Primary Examiner*—Hassan Kizou
*Assistant Examiner*—Hooman Houshmand
(74) *Attorney, Agent, or Firm*—Theodore U. Ro

(57) ABSTRACT

A data multiplexer that accommodates both industry standard CCSDS data packets and bits streams and standard IEEE 1394 data is described. The multiplexer provides a statistical allotment of bandwidth to the channels in turn, preferably four, but expandable in increments of four up to sixteen. A microcontroller determines bandwidth requested by the plurality of channels, as well as the bandwidth available, and meters out the available bandwidth on a statistical basis employing flow control to the input channels.

19 Claims, 9 Drawing Sheets

U.S. PATENT DOCUMENTS

| | | | |
|---|---|---|---|
| 2004/0047374 A1* | 3/2004 | Wielgosz et al. | 370/537 |
| 2004/0141516 A1* | 7/2004 | Lee | 370/428 |
| 2004/0246891 A1* | 12/2004 | Kay et al. | 370/215 |
| 2007/0115904 A1* | 5/2007 | Chen et al. | 370/338 |

OTHER PUBLICATIONS

Saad et al, "An IEEE 1394—Firewire—Based Embedded Video System for Surveillance Applications" Proceedings of the IEEE Conference on Advanced Video and Signal Based Surveillance (AVSS'03), 2003.*

"Lossless data compression", CCSDS 121.0-B-1, Blue Book, cover page, May 1997.*

* cited by examiner

NUMFRMRDY=NUMFRMRDY+FRMCNT

US 7,397,774 B1

DOWNLINK DATA MULTIPLEXER

The invention described herein were made by employee(s) under contract with the United States Government and may be manufactured and used by or for the Government of the United States of America for governmental purposes without the payment of any royalties thereon or therefor.

FIELD OF THE INVENTION

The present invention relates generally to the field of data communications and, more particularly, to a statistical multiplexer that provides flow control to its inputs.

BACKGROUND OF THE INVENTION

The multiplexing of a plurality of signals for transmission via a single transmission medium is common practice in the art. In particular for digital systems, a number of digital signals are multiplexed by assigning a predetermined proportion of the total bit rate available in the transmission medium to each of the signals that it is desired to transmit. The proportion of the available bit rate assigned to each signal is typically fixed in each system.

However, in multi-channel systems, often the bit rate required by different channels varies substantially from the bit rate required of other channels.

For example, Schmitz, U.S. Pat. No. 6,301,250, describes combining a time division multiplexed (TDM) signal into one or more "transmission capacity assigned" ATM channel(s). The input channels are assigned a fixed rate, so that if the bit stream from one channel far exceeds that of another, the system does not accommodate the difference. Further, no flow control for the different channels is provided.

Budge et al., U.S. Pat. No. 6,219,359, describes a device that adjusts the distribution of the bit rate allocation in response to differences between the indicated picture quality. However, the system described does not control the flow of data of different data types, such as for example bit streams and digital camcorders or video tape recorders, and does not provide flow control to reallocate bandwidth to throttle various channels up and down to fill up an existing transmission link.

Thus, there remains a need for a data transmission system which statistically controls the allocation of bandwidth to various transmission channels to most efficiently utilize the transmission link. Further, there remains a need for such a digital data transmission system which can accommodate a plurality of data types, such as for example bit stream and data packets and digital video data. Further, there remains a need for a system which controls the flow of data in a plurality of data channels by reducing the data flow in one channel while permitting increased data flow from another channel in response to the quantity of data to be transmitted. The present invention is directed to filling these and other needs in the art.

SUMMARY OF THE INVENTION

The present invention provides a data multiplexer which accommodates both industry standard CCSDS data packets and bits streams and standard IEEE 1394 data. Heretofore, IEEE 1394 video image packets were only transmittable over direct links (i.e. equipment connected by cabling). The multiplexer provides a statistical allotment of band width to the channels in turn, preferably four, but expandable in increments of four up to sixteen.

A microcontroller determines bandwidth requested by the plurality of channels, as well as the bandwidth available, and meters out the available bandwidth on a statistical basis. The microcontroller by nature functions as an asynchronous device, and therefor drives a master input erasable programmable logic device (EPLD), whose function is precisely known for each clock cycle. The master input EPLD controls the apportionment of data packets onto a main bus. The data from the main bus, now multiplexed with varying data packet lengths, is then error correction encoded, randomized, and interleaved, converted into serial form, and transmitted over a radio frequency transmission link.

These and other features and advantages of this invention will be readily apparent to those skilled in the art.

BRIEF DESCRIPTION OF THE DRAWINGS

So that the manner in which the above recited features, advantages and objects of the present invention are attained and can be understood in detail, more particular description of the invention, briefly summarized above, may be had by reference to embodiments thereof which are illustrated in the appended drawings.

DETAILED DESCRIPTION OF A PREFERRED EMBODIMENT

Figure 1:
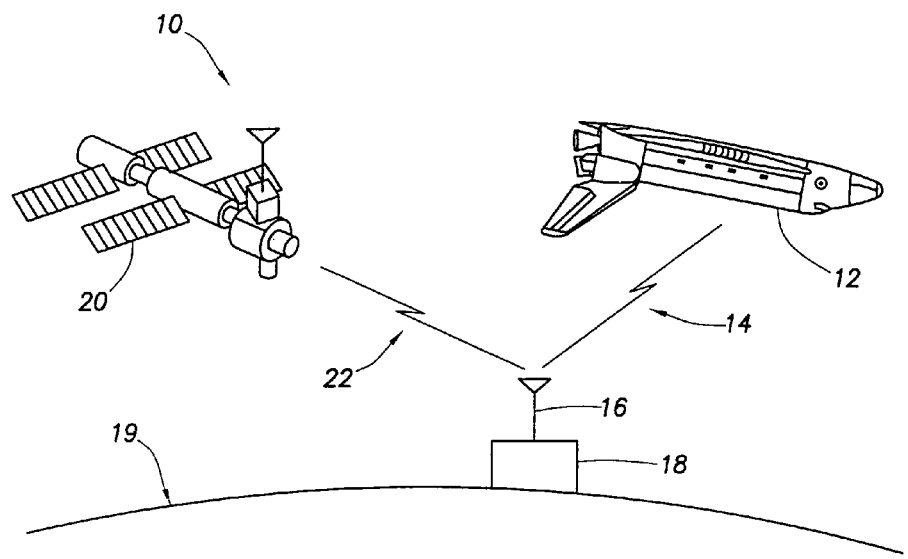
FIG. 1 is a schematic illustration of the environment in which the present invention finds application.

FIG. 1 depicts a stylized view of a communications system 10 in which the present invention may find application, although it is to be understood that the invention herein described is broadly applicable to other data multiplexing scenarios. The system 10 includes a space shuttle 12, on which the multiplexer of the invention is included, for transmission of digital signals over a transmission link 14 to an antenna 16 at a ground station 18, for example, on the face of the earth 19. The ground station 18 further includes a demultiplexer (not shown) for the reconstruction of digital signals sent from the shuttle 12, and operates substantially in a reverse manner from that described below in respect of a multiplexer. The system 10 may also include a space station 20, which also transmits a plurality of digital channels over a transmission link 22 to the ground station. One advantage of the present invention is that the interface to the transmission links 14 and 22 are compatible, a feature not heretofore known in the art. Thus, broadly speaking, while the structure described below is referred to as a downlink data multiplexer, the present invention may find application in many other data handling environments in which data is handled over a plurality of channels simultaneously.

In the operation of the system 10, various channels carry digital signals of the transmission links to the ground station 18 in the form of data, voice, and video communications. These digital signals typically have quite different baud rates. In previous systems, while some channels may be underutilized, other channels may have to wait to transmit data because too much data is assigned to a certain channel. The present invention is directed to solving this drawback in the art.

Figure 2:
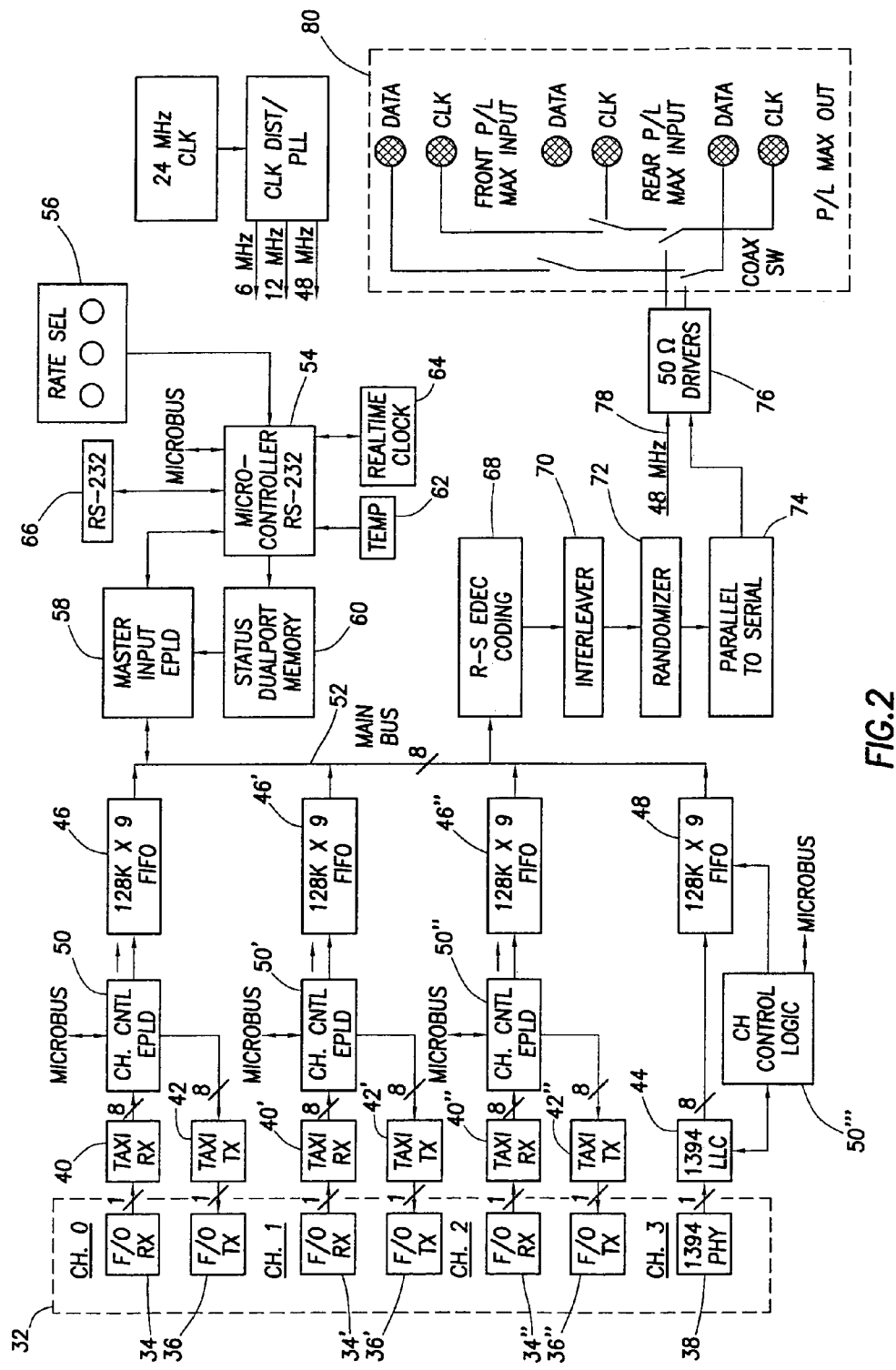
FIG. 2 is block diagram of multiplexer of the present invention.

FIG. 2 depicts a block diagram of a presently preferred embodiment of a data multiplexer 30 of the present invention. The multiplexer 30 includes an input/output (I/O) interface 32 comprising four channels, although the architecture is expandable to more channels, for example sixteen channels. The channels are labeled channel 0, channel 1, channel 2, and channel 3 in FIG. 2. Channels 0, 1, and 2 are CCSDS packet or bit stream interfaces, while channel three is an IEEE 1394 compatible interface. The acronym CCSDS refers to the Consultative Committee for Space Data Systems, an international consensus organization of space agencies that has developed standards for space-based telemetry data handling.

The IEEE 1394 standard, well known in the art, provides high-speed serial bus enhanced PC connectivity for electronics audio/video (A/V) appliances, storage peripherals, other PCs, and portable devices. This standard defines the physical layer and the data-link layer of the International Organization for Standardization (ISO) model. The IEEE 1394 input defines isochronous packets, conforming to IEC 61883. IEC-61883 is a standard communications and control interface used by IEEE 1394 audio and video devices. In Windows 98 SE, Windows 2000 and earlier operating systems, 61883 functionality was implemented as part of the Microsoft Digital Video (MSDV) camcorder driver, msdv.sys. In Windows ME, Windows XP and later operating systems, 61883 functionality has been moved to a separate driver dedicated to 61883 support. Vendor-supplied IEC-61883 client drivers send requests to the system-supplied IEC-61883 protocol driver (61883.sys), to communicate with their devices. In FIG. 2, channel 3 receives direct connection to video input devices, such as for example camcorders and the like.

Channel 0 includes a fiber optic (F/O) receiver 34 to receive signals into the multiplexer, and an F/O transmitter 36 to send digital signals back from the interface 32. Similarly, channel 1 includes receiver 34' and transmitter 36', and channel 2 includes receiver 34" and transmitter 36". The IEEE 1394 interface is labeled 38 in FIG. 2.

The receivers 34 feed a transparent asynchronous xmitter interface (TAXI) 40 and the receivers 34' and 34" feed TAXI interfaces 40' and 40". Similarly, the transmitters 36, 36', and 36" receive signals from TAXI transmitters 42, 42', and 42". Each of the transmitters 42, 42', and 42" provides a flow control function, in the event that its corresponding TAXI receiver exceeds the maximum flow rate for that channel. However, channel 3 is not flow controlled, providing an input to the system through a link layer controller 44.

The TAXI receivers 40, 40', and 40" feeds data packets into buffers 46, 46', and 46", respectively. The 46, 46', and 46" as preferably 128K×9 first-in/first-out (FIFO) memory buffers, although other buffers may be effectively used. Similarly, the link layer controller 44 feeds digital data into a buffer 48. The reading out of data from the buffers 46, 46', and 46" and 48 is controlled by its dedicated channel controller 50, 50', and 50", and 50'". Each of the channel controllers is preferably an erasable programmable logic device (EPLD). The channel controllers, are polled in a round robin (or "fairest of them all") fashion, feed data onto a main buss 52, in a statistical manner as described below. In this way, each of the channel controllers has an opportunity to send data, each in its turn through the round robin loop.

The polling of the channel controllers for the release of data is managed by a micro-controller 54. In a preferred embodiment, the micro-controller has 255 slots allocated per cycle. The micro-controller allocates a certain number of slots to each channel controller each cycle, and the number of slots varies with each cycle, depending on how full each of the channels is during that cycle, i.e., how many telemetry frames worth of data each channel has. The requested number of telemetry frames for transmission may be manually set with a rate selector 56. However, the multiplexer uses a statistical allocation process, in that if one of the channels does not use up its allocation, the remainder may be reallocated to another channel for that cycle. Also, if one channel requests more allocation than is available, that channel is blocked until its requested allocation is decreased.

The micro-controller 54 orders "send data" commands through a master input erasable programmable logic device (EPLD) 58. The multiplexer 30 as shown in FIG. 2 provides 48 megabits of data per second, although other rates may be used. If the total data from the channels is less than the capacity of the multiplexer, then the EPLD 258 is ordered by the micro-controller 54 to send fill frames, to maintain the communications link.

A status dualport memory 60 which retains status information of the platform on which the multiplexer resides, such as for example temperature from a temperature sensor 62, clock time from a realtime clock 64, and other status information. The data retained within the memory 60 is then included in the transmitted frames created by the master input EPLD 58.

As previously described, the master input EPLD 58 directs the data, either as bit stream mode or CCSDS packets from channels 0, 1, and 2, and IEEE 1394 data from channel 3. This data is directed in its proper turn to a Reed-Solomon Error Detection, Error Correction (R-S EDEC) coding module 68, in a manner well known in the art. This error detection and correction was first described in "Polynomial Codes over Certain Finite Fields," by Irving S. Reed and Gustave Solomon, Journal of the Society for Industrial and Applied Mathematics, 1960. From the module 68, the data passes to another error detection/correction module, depicted in FIG. 2 as a 64 deep frame interleaver 70. The interleaver 70 writes the Reed-Solomon code blocks, 256 bytes long, to a 64 deep memory as rows, then reads the code blocks in single byte columns. Thus, the interleaver scrambles code bits among multiple blocks so that they are not contiguous when transmitted; as a result, any bursty errors caused by channel corruption or other causes are transformed, or spread out, into more R-S code blocks allowing longer bursts of errors to be corrected after deinterleaving, in a manner known in the art.

The data leaving the interleaver 70 next goes to a randomizer 72 in order to assure an adequate number of transitions (zero to one or one to zero) to maintain the data link. Too many ones in a row, or too many zeros, will cause the communication link to cease to function. The randomizer 72 preferably uses a CCSDS randomizing code. The randomized data is then sent through a parallel to serial converter 74 for transmission. Data is serial sent through a set of 50Ω drivers 76, as well as a 48 MHz clock, to interface to the KU band interface for transmission of the data. Finally for FIG. 2, the data flows to an output panel 80, including data and clock jacks for front and rear payload (P/L) input and P/L output, so that the multiplexer 30 can accommodate coupling to other equipment and provides a bypass function to the Ku band interface if required.

In summary, for the multiplexer of FIG. 2, four channels are illustrated, but may be expanded up to 16 channels in increments of 4. Minimum overhead for the multiplexer is ((256/233)−1)/100=9.87%, which equates to approximately 43.6875 Mbps maximum throughput. Only complete packets are sent for the CCSDS packets and IEEE 1394 packets. The multiplexer sends either valid data or fill frames or frame fill (frame partially filled with fill data). The input rate is set by priority: (1) uplinked rate; (2) IEEE 1394 packets channel when active; (3) 3.1 Front panel controls for SS rates, 3.2 requested rate for STS for inputs with identification header coding which are requesting a rate; and (4) lowest rate when in STS and no correct header requested rate. The demultiplexer at the ground station restores the data to the format delivered to multiplexer. The CCSDS minimum packet length is 233 bytes (one frame), maximum is 4096 bytes.

Figure 3A:
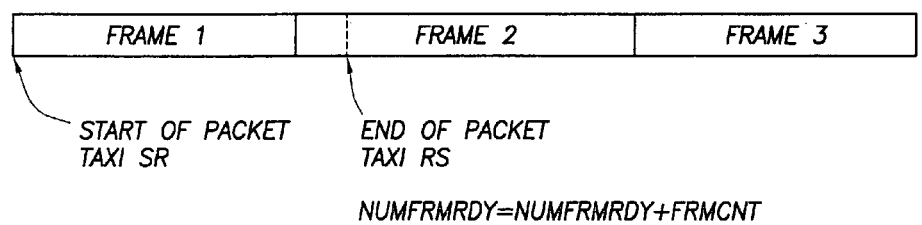
FIG. 3A is a diagram that shows the relationship between packets and frames for the circuit of FIG. 3.
Figure 3:
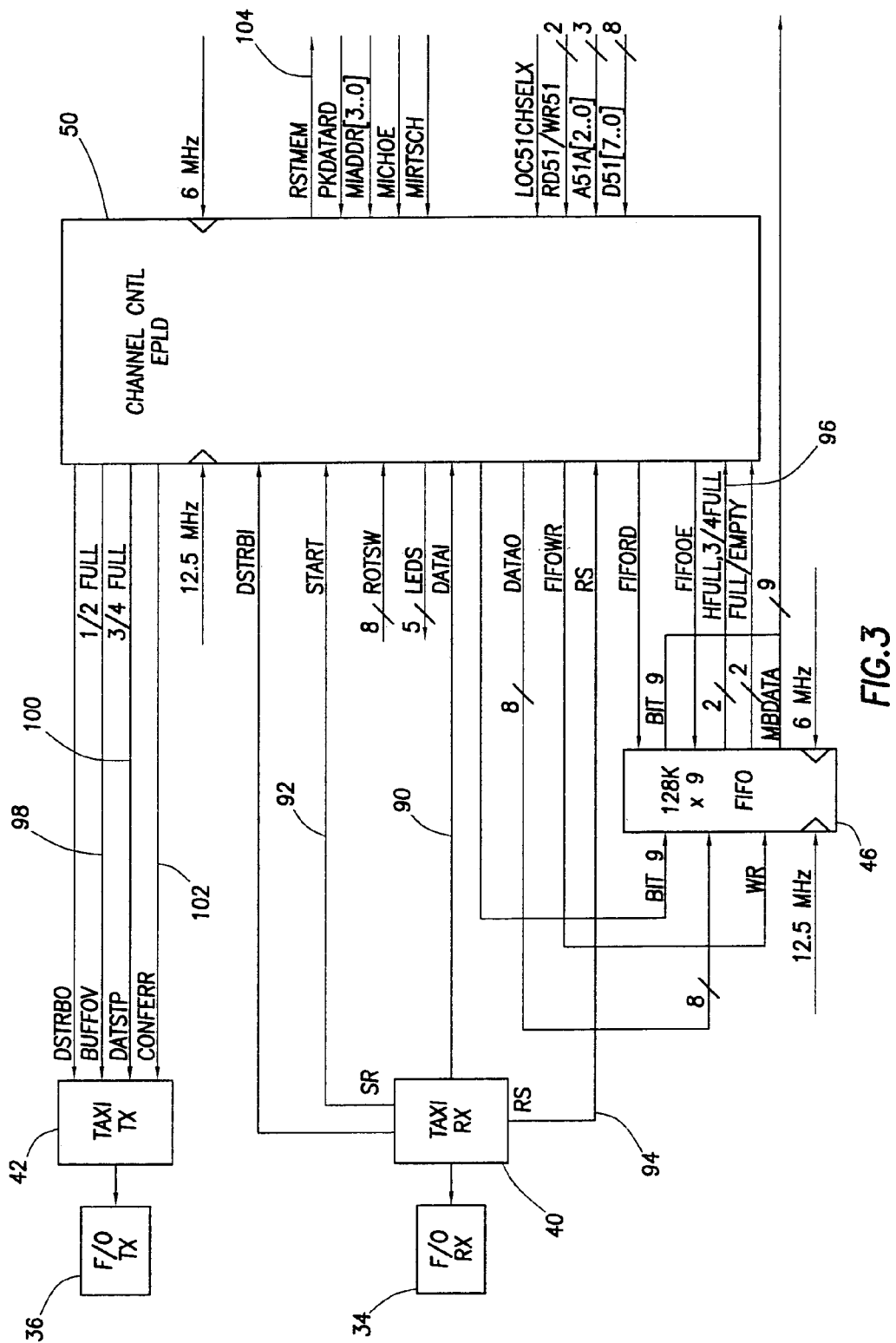
FIG. 3 is block diagram of an input channel circuit for the CCSDS packets and bit stream channels of the multiplexer of FIG. 2.
Figure 3B:
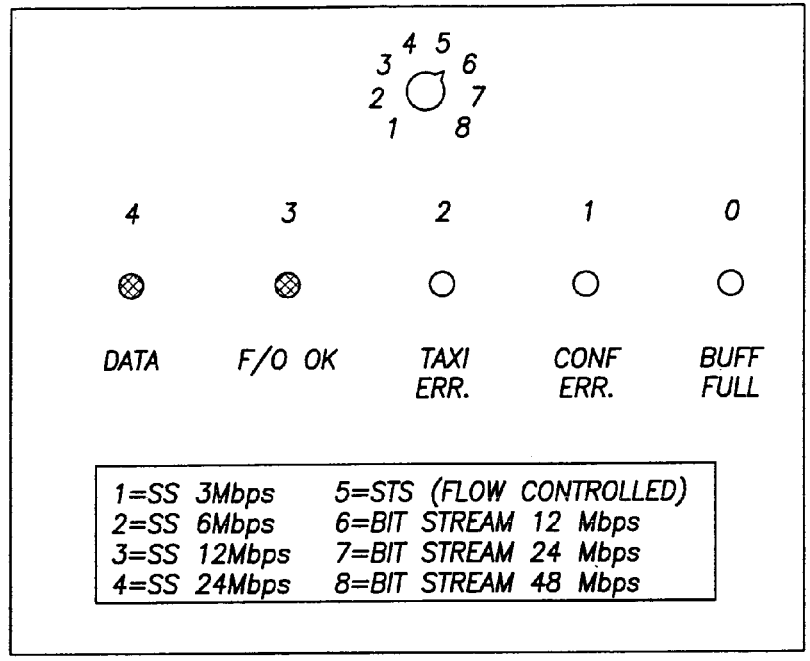
FIG. 3B is a schematic of a set of panel controls and indicators for the circuit of FIG. 3.

FIG. 3 depicts a block diagram of an input channel including the flow control aspects of the invention for one channel of the CCSDS packet and bit stream channels 0, 1, and 2. One channel is shown, and the other channels are constructed and function in the same way. As previously described, each channel includes a channel control EPLD 50, operatively coupled to a F/O transmitter 36, a TAXI transmitter 42, a F/O receiver 34, a TAXI receiver 40, and a buffer 46. (Note—SS stands for Space Station, STS stands for Space Transportation System (a.k.a. Space Shuttle) In the following discussion, "msb" refers to most significant bit, and "lsb" refers to least significant bit.

As defined in Table 1, the channel control EPLD 50 preferably provides the following memory map:

TABLE 1

| 8 Bytes Read | | 8 Bytes Write | |
|---|---|---|---|
| 7 | | 7 | |
| 6 | | 6 | |
| 5 | | 5 | |
| 4 | Payload: SS[6], STS[5] Numfrmrdymsb [1 . . . 0] | 4 | |
| 3 | Numfrmrdylsb [7 . . . 0] | 3 | |
| 2 | Frntpan[7 . . . 5] (Encoded) Rqstrate[4 . . . 0] | 2 | Uplink rate[7 . . . 0] |
| 1 | Front panel LED status[4 . . . 0] | 1 | Uplink command [0] |
| 0 | CONFSHG [3], RSTMEM[2], CHACTIVE [1], FRMRDY[0] | 0 | RSTMEMRD[3], CHLOCK[2], Reset Channel [1], CONFERR[0] |

The multiplexer, in channels 0, 1, and 2, may operate in one of two modes, bit streams or packets. In sending packets of data, only complete packets of data are sent. As shown in FIG. 3A, the term NUMFRMRDY refers to the number of frame boundaries crossed (modulo 233). Partial remaining frames, resulting by packets not being on exact frame boundaries, are read out by the master input EPLD based on the size of the packets. Further, packet size may vary from 233 to 4096. The NUMFRMRDY count is not added to until the packet has been completely received, when operating in packet modes.

Returning to FIG. 3, data is transmitted from the TAXI receiver 40 over a DATAI line 90. A set of lines, TAXI SR 92 and TAXI RS 94, determine the start and the end of a packet of data, respectively. However, these lines serve no function if data is transmitted in bit stream mode. NUMFRMRDY, a register resident in the channel control EPLD, is decremented as the FIFO buffer 46 is read out with Master input address referring to the selected channel, shown in FIG. 3 as MIADDR[3 . . . 0].

For data input flow control, if the buffer 46 reaches half full, HFULL 96 (i.e. greater than 281 frames, assuming 233 byte user data area in frames), then a buffer overflow BUFFOV 98 is sent to the TAXI transmitter 42. If the buffer is ¾ full on line 96, (i.e. greater than 421 frames), then DATSTP on line 100, to pause the sending of data to the buffer 46. If the number of frame boundaries NUMFRMRDY is greater than 527 ((128K−8K)/233), wait until TAXI RS, then disable Mem WR, activate Buffer Full LED. Send RSTMEM. Memory will be reset when it is not being read. All three flow control steps are undone when NUMFRMRDY drop below specified level that activated each one.

The channel control EPLD 50 may also issue a configuration error CONFERR on a line 102. This is set when in the STS mode, and too large of an allocation is being requested via the sending device (encoder). It is also set when in SS mode, and too large of an allocation is being requested via select switch on the multiplexer. First channel in order 0 to 15 to cause total to go over 48 MbpS receives CONFERR and is disabled. This does not include channel 3, the IEEE 1394 channel), which retains the highest priority meaning that all available 1394 packets are sent per each poll. A configuration error also occurs in SS mode if the multiplexer switch and sending device (encoder) requested rate differ or if sending device and multiplexer are not in agreement as to whether STS or SS mode is being used. The configuration error condition resets Mem (when not selected by master input EPLD), sets Multiplexer LED, and sends CONFERR code to encoders. In these cases, Multiplexer CONFERR LED and CONFERR code is sent to sending device. FIFO MEM is reset and data flow is inhibited. After a MEM reset, input EPLD starts processing new packets checking the requested rate for STS and SS modes again from panel select for SS. When RQSTRATE (from encoders, or front panel for SS) has changed to be that required by front panel selections and requested rate can be accommodated, CONFERR is released and data is passed. The EPLD provides data, and the microprocessor determines CONFERR and sends to EPLD.

A reset memory, RSTMEM, is provided on line 104. This resets memory and starts a new sequence after it has been detected that the 8051 has read the RSTMEM location in the channel input EPLD 8051 50 memory space and MIEPLD is not reading channel and channel not locked by 8051 (channel lock means 8051 has read number of frames ready and expects data to be available). MIEPLD finishes current packet if RSTMEM received during channel data transfer.

MIRSTCH is sent from MIEPLD to Channel Input EPLD to indicate MIEPLD has detected an error (packet count error, compares toggling Bit 9 to packet size loaded into MI EPLD) and is requesting channel input EPLD to reset channel memory and start a new sequence. The MI EPLD sends MIRSTCH if Bit 9 does not toggle at the same time corresponding to the packet length count down in the MI EPLD indicating a bad packet. This bad packet will be completed up to the packet length indicated and then MIEPLD will change channels. The ground Demultiplexer will determine the bad packet length count and throw out the packet rather than relaying it to the ground depacketizer similar to how it handles fill packets and frames. Fill is produced by the Virtual Channel Identifier (VCID) of 0x00 and the packet start location in the frame header. It the packet start location is the first byte of the frame and the VCID=0x00, the whole frame will be a fill frame.

Locating RQSTRATE—The RQSTRATE is located by the Channel Input EPLD for each packet that has a secondary header and APID of 00000000000 or 00000000001. As defined in Table 2, the RQSTRATE provides the map:

TABLE 2

| 5 Bit | | | | | |
|---|---|---|---|---|---|
| 4 | 3 | 2 | 1 | 0 | Rate |
| 0 | x | x | x | x | No request |
| 1 | 0 | 0 | 0 | 0 | SS3 |
| 1 | 0 | 0 | 0 | 1 | SS6 |
| 1 | 0 | 0 | 1 | 0 | SS12 |
| 1 | 0 | 0 | 1 | 1 | SS24 |
| 1 | 0 | 1 | 0 | 0 | STS3 |
| 1 | 0 | 1 | 0 | 1 | STS6 |
| 1 | 0 | 1 | 1 | 0 | STS12 |
| 1 | 0 | 1 | 1 | 1 | STS24 |
| 1 | 1 | 0 | 0 | 0 | STS16 |
| 1 | 1 | 0 | 0 | 1 | STS20 |
| 1 | 1 | 0 | 1 | 0 | STS28 |
| 1 | 1 | 0 | 1 | 1 | STS32 |
| 1 | 1 | 1 | 0 | 0 | STS36 |
| 1 | 1 | 1 | 0 | 1 | STS43 |

Bit 9 of Channel Input FIFO—Bit 9 high during first byte of packet indicates packet boundary. This is used by Channel input EPLD to produce FRMRDY. FRMRDY is activated only after a complete packet has been received (in packet mode). Thus indicating if there are any packets ready or not. NUMFRMRDY [9 . . . 0] is added to after complete packet is received (packet mode), and is decremented as frames are read out. Used by Master Input EPLD to find packet size for CCSDS packets and to validate packets by comparing packet size (count down) to when Bit 9 toggles. The packet length is located and checked by the MI EPLD as compared to Bit 9 toggling. When an error is detected, the signal MIRSTCH is sent to the selected channel for channel reset. [VCID bit 6=1 indicates packets, bit 6=0 indicates bit stream.]

CONFCHG occurs if: the front panel rotary knob is changed, the RQSTRATE changes for CCSDS packet inputs, or if the channel changes its CHACTIVE status. RSTMEMRD—writing 1 resets CONFCHG to 0.

Table 4, below, lists the various operating scenarios of the multiplexer of the present invention, in the absence of uplinked commands, for channels 0, 1, and 2.

TABLE 3

| MUX Front Panel Settings | Payload | Action Taken |
|---|---|---|
| STS | Channel request accumulation is less than 48 | Operate normally as requested |
| STS | Channel request accumulation is > 48 | Last channels polled causing the greater than 48 receive CONFERR and data is not passed |
| STS | No request | Set to lowest rate |
| STS | SS from RQSTRATE | CONFERR and data is not passed |
| SS | STS from RQSTRATE | CONFERR and data is not passed |
| SS | Request # SS from RQSTRATE | Operate normally at requested |
| SS | Request > SS from RQSTRATE | CONFERR and data is not passed |
| SS | No request | Set to front panel rate |
| SS accumulated rate > 48 | Don't care | Last channels causing more than 48 get CONFERR |
| Bit stream | STS from RQSTRATE | CONFERR and data is not passed |
| Bit stream | SS from RQSTRATE | CONFERR and data is not passed |
| Bit stream CH requested accumm <= 48 | N/A | Operate normally |
| Bit stream CH requested accumm > 48 | N/A | CONFERR and data is not passed |

The table below lists the various operating scenarios of the multiplexer of the present invention with uplinked commands.

TABLE 4

| Uplinked | Front Panel | Payload | Action Taken |
|---|---|---|---|
| Uplinked Rate STS | Ignored | Channel requested rate is # uplinked | Operate normally at uplinked rate |
| | " | Channel requested rate is > uplinked | Send CONFERR data not passed |
| | " | No request | Channel operates at uplinked rate |
| Uplinked Rate SS | " | Channel requested rate is # uplinked | Operate normally at uplinked rate |
| | " | Channel requested rate is > uplinked | Channel receives CONFERR and data is not passed |
| | " | No request | Channel operates at uplinked rate |
| Uplink Rate Bitstream | " | Channel rate # uplinked rate | Channel operates at uplinked rate |
| | " | Channel rate > uplinked rate | Channel receives CONFERR and data is not passed |

Figure 4A:
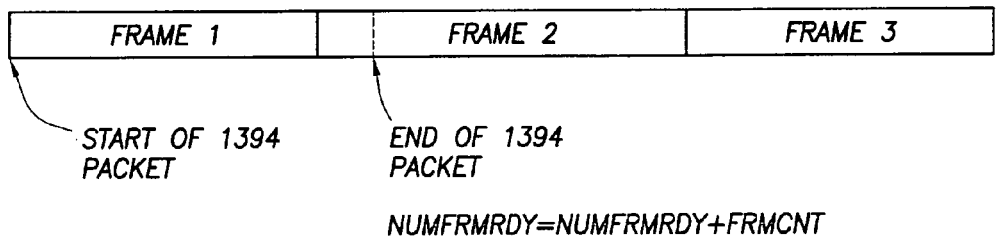
FIG. 4A is a diagram that shows the relationship between packets and frames for the circuit of FIG. 4.
Figure 4:
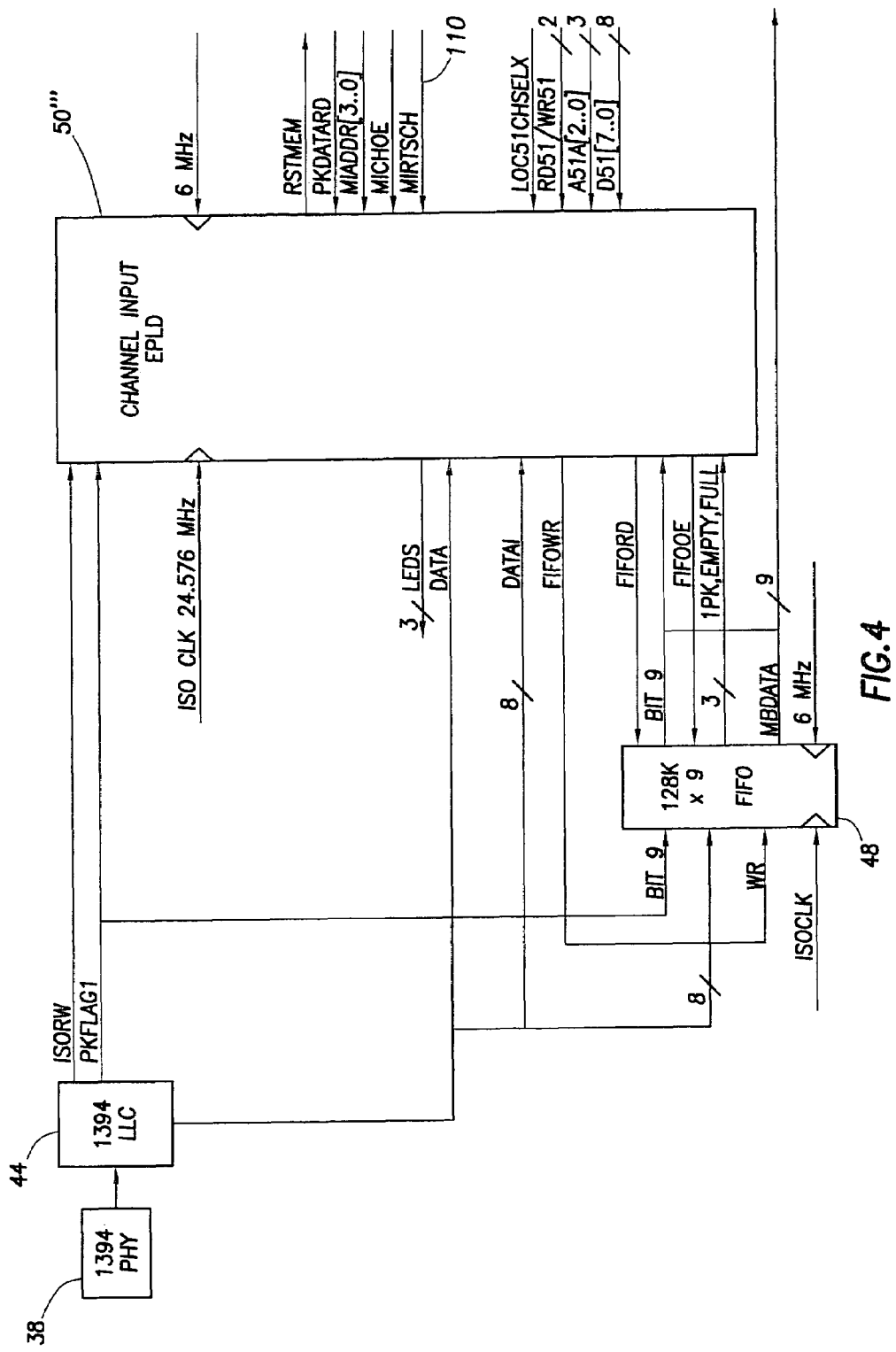
FIG. 4 is a is block diagram of an input channel circuit for the IEEE 1394 packet channel 3 of the multiplexer.
Figure 4B:
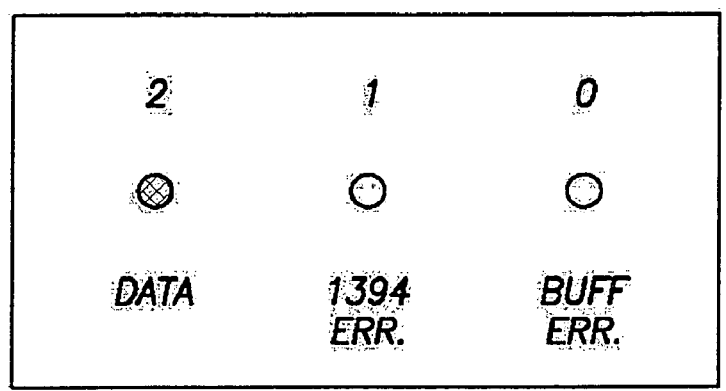
FIG. 4B is a schematic of a set of panel indicators for the circuit of FIG. 4.

FIG. 4 depicts a block diagram of the input channel control aspects of the invention for the channel 3, the IEEE 1394 packet channel (FIG. 4). As previously described, channel 3 is not flow controlled, providing an input to the system through a link layer controller 44 from the 1394 physical interface 38. The link layer controller 44 is operatively coupled to the channel control logic 50''' and the buffer memory 48.

As defined in Table 5, the channel control EPLD 50''' preferably provides the following memory map:

TABLE 5

| 8 Bytes Read | | 8 Bytes Write | |
|---|---|---|---|
| 7 | | 7 | |
| 6 | | 6 | |
| 5 | | 5 | |
| 4 | | 4 | |
| 3 | | 3 | |
| 2 | CHLOCKReadback[2], ResetChReadback[1] | 2 | |
| 1 | Front panel LED status[2 . . . 0] | 1 | |
| 0 | CONFSHG [3], RSTMEM[2], CHACTIVE [1], FRMRDY[0] | 0 | CHLOCK[2], Reset Channel [1] |

Just as with channels 0, 1, and 2, in sending packets of data in channel 3, only complete frames of data are sent. As shown in FIG. 4A, the term NUMFRMRDY refers to the number of frame boundaries crossed (modulo 233). Partial remaining frames, resulting by packets not being on exact frame boundaries, are read out by the Master input EPLD based on the size of the packets. Further, packet size may vary from 233 to 4096. The NUMFRMRDY count is not added to until the packet is complete, when operating in packet modes. NUMFRMRDY is decremented as the FIFO MEM is read out with the master input address referring to the selected channel. The reset memory zeros the memory and starts a new sequence after it has been detected that the EPLD 50 has read the RSTMEM location in the channel input EPLD memory space and the master input EPLD is not reading the channel and the channel is not locked by the channel control EPLD. Channel lock means the channel control EPLD has read the number of frames ready and expects data to be available. The master input EPLD finishes the current packet if RSTMEM is received during a channel data transfer. A signal on line 110, labeled MIRSTCH, is sent from the master input EPLD to the channel input EPLD to indicate that the master input EPLD has detected an error, such as a packet count error, compares toggling Bit 9 to packet size loaded into the master input EPLD) and is requesting channel input EPLD to reset channel memory and start a new sequence. The master input EPLD sends MIRSTCH if Bit 9 does not toggle at the same time corresponding to the packet length count down in the master input EPLD indicating a bad packet. This bad packet will be completed up to the packet length indicated and then the master input EPLD will change channels. The ground demultiplexer will determine the bad packet length count and throw out the packet rather than relaying it to the ground depacketizer, in a manner similar to how it handles fill packets and frames. A fill is produced by the VCID of 0x00 and the packet start location in the frame header. If the packet start location is the first byte of the frame, the whole frame is a fill frame.

Table 6 below lists the various operating scenarios of the multiplexer of the present invention, in the absence of uplinked commands, for channel 3.

TABLE 6

| MUX Front Panel Settings | Payload | Action Taken |
| --- | --- | --- |
| N/A | 1394 Active | channel 3 given top priority, all frames sent per poll. |
| N/A | 1394 Not Active | Bit rate allocation divided between other channels |

Table 7 below lists the various operating scenarios of the multiplexer of the present invention with uplinked commands for channel 3.

TABLE 7

| Uplinked | Front Panel | Payload | Action Taken |
| --- | --- | --- | --- |
| Uplink command contains channel 3 | Ignored | 1394 Active | Channel operates at uplinked rate with channel 3 taking highest priority |
| Uplink command does not contain channel 3 | " | 1394 Active | Channel 3 is disabled if commanded to by uplink |
| Uplink command contains channel 3 | " | 1394 Not Active | Channel 3 operates at uplinked rate but allocates channel bandwidth to other channels |

TABLE 7-continued

| Uplinked | Front Panel | Payload | Action Taken |
| --- | --- | --- | --- |
| Uplink command does not contain channel 3 | " | 1394 Not Active | Channel 3 is disabled if commanded to by uplink, allocates bandwidth to other channels |

Figure 5:
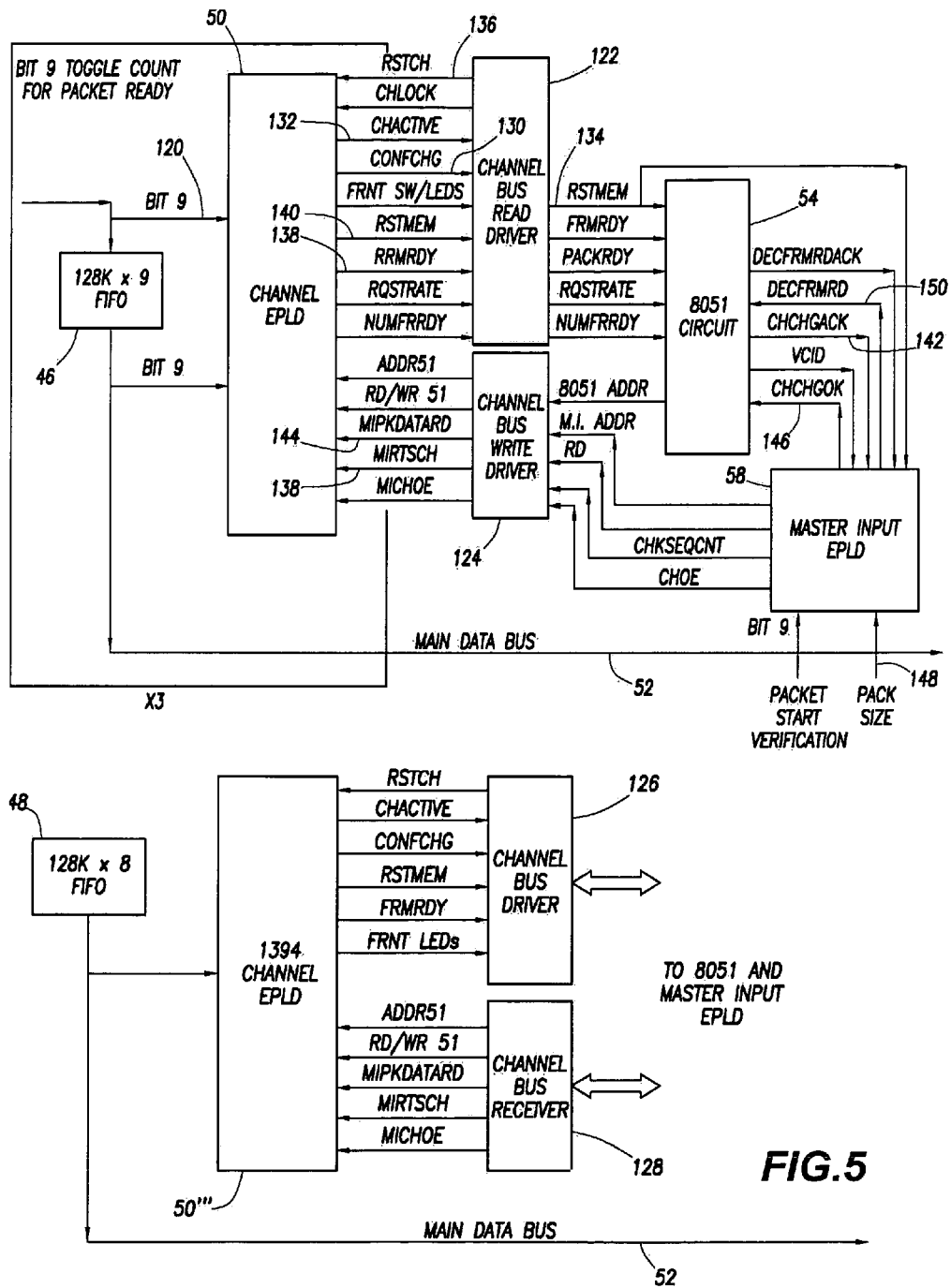
FIG. 5 is a block schematic diagram of a data formatting portion of the multiplexer.

FIG. 5 shows a block diagram of the data formatting portion of the multiplexer. As previously described, the multiplexer comprises three CCSDS channels 0, 1, and 2, only one of which is shown in FIG. 5 for simplicity. The CCSDS channel includes a buffer memory 46, and the IEEE 1394 channel, channel 3, includes a buffer memory 48. The buffer memories 46 and 48 feed data onto a main bus 52 under the control of the multiplexer. The buffer 46 also includes a bit 9 toggle count 120 to signal the beginning of a packet. The toggle count 120 is coupled to the Channel EPLD 50 which is further operatively coupled to the microcontroller 54 and the master input EPLD 58. The circuit further includes a channel bus read driver 122 and a channel bus write driver 124 to synchronously carry the commands of the microcontroller 54 and master input EPLD 58. Similarly, channel 3 includes a channel bus driver 126 and a channel bus receiver 128, which also communicate with the microcontroller 54 and master input EPLD 58.

Sequence of Events

Figure 6:
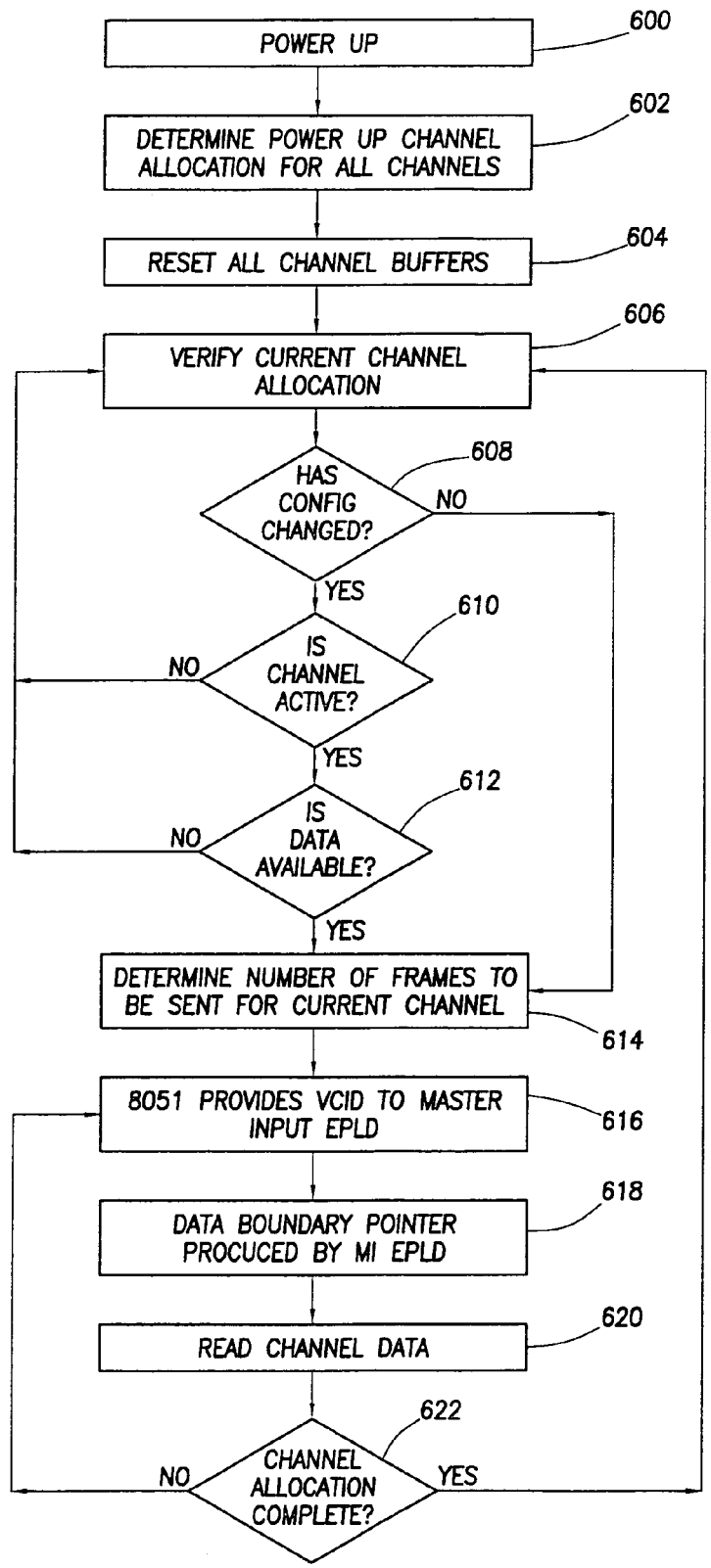
FIG. 6 depicts the logic flow, or sequence of events, in the operation of the data formatting of FIG. 5

FIGS. 6A and 6B illustrate the logic flow, or sequence of events, in the operation of the data formatting of FIG. 5. Initially, upon power up in step 600, the microcontroller 54 defaults to a VCID of 0x00 to produce fill frames, until packet-filled frames are ready from channels 0, 1, 2, and 3. Further, the power up or initial channel allocation for all channels must be set to a default. CONFCHG 130 is set at power up in step 602 and any time a channel's requested rate or type of service or active state has changed.

The microcontroller 54 determines which channels are active by way of CHACTIVE 132. It then determines the requested channel rates and builds an allocation table based on these requests. The microcontroller 54 next determines the current channel's channel allocation based on, in priority order: 0. If Channel 3 (the IEEE 1394 channel) is active (channel 3 gets highest priority); 1. Uplinked rate; 2.1 Selected rate from front panel (for Station settings or bitstream service)—or—2.2 The requested rate (from encoder (encoders identified by APID)) (other users may not be requesting a rate by way of CCSDS packet secondary header); 3. Lowest rate when front panel is selected for STS and no correct header requested rate, as described above in respect of FIGS. 3 and 4. If the requested rate for each channel can be accommodated, it is added to the allocation table, if not, configuration errors (CONFERRs, previously described) are sent and the channel is blocked until it requests a rate that can be supported.

In step 604, the microcontroller 54 then resets all channel buffers by way of RSTCH 136 from the microcontroller 54. There is a RSTMEM 134 from the channels to the microcontroller 54 to tell that channel FIFOs are being reset. There is also a MIRSTCH 138 from the master input EPLD to the channel FIFOs to allow control over these memory buffers.

Next, the microcontroller 54 verifies the current channel allocation in step 606 and by the sequence of steps to follow. It determines if configuration has changed in step 608 by way of CONFCHG 130. If configuration has changed, the microcontroller 54 determines if the channel is active in step 610 by way of CHACTIVE 132. If not active, it sends RSTMEM 134 and de-allocates this channel's allocation from the allocation table, and once again determines if configuration has changed by returning to step 606. If configuration has changed, and the channel is active, then the microcontroller 54 determines the requested channel rate and builds an allocation table based on the request, as previously described, in priority order. Whether the requested rate can be accommodated or not, RSTMEM 140 is sent to clear current channel buffer to start new data gathering and to prevent buffer overflow.

Next, the microcontroller 54 chooses a channel by polling for indications on FRMRDY 138 from each channel in sequence to find which channel has data in step 612. The sequence will be the channels in order, 0 to 3 (or 0 to 15). The FRMRDY signal is one of several signals that all channels have in common which are activated (read by microcontroller 54) when the microcontroller 54 addresses each specific channel. FRMRDY active means that at least one complete packet and one complete frame has been received.

Next, in step 614, microcontroller 54 determines the number of frames to be sent for the current channel. The number of frames to be sent for the current channel are determined by: number of frames ready (decremented after each frame completely read, added to only after completed packets received); and previous over run of channel allocation from last time channel was polled. The microcontroller 54 in step 616 then provides VCID to the master input EPLD 58. The VCID is made available to the Master Input EPLD for inclusion into the frame header. Next, CHCHGACK 142 is sent from microcontroller 54 to the master input EPLD.

In step 618, a data boundary pointer (first header pointer) is produced by the master input EPLD. During frame header creation, the Master Input EPLD determines the Data Boundary Pointer value, based on the remaining packet data size for the upcoming frame. A first header pointer is sent for every packet whether VCID changes or not. A first header pointer of 0x00=1$^{st}$ byte of frame is first byte of new packet. A first header pointer of 0xFF=No new packet header in this frame.

The microcontroller 54 then reads channel data in step 620 by way of MIPKDATARD 144. The microcontroller 54 allows channel change in step 622 if channel allocation complete by sending CHCHGOK 146 from Master input EPLD to the microcontroller 54. If the microcontroller 54 determines that the current channel is not complete, then the VCID remains the same. The process continues with the microcontroller 54 providing VCID to the master input EPLD in step 616 as previously described. If the microcontroller 54 determines that current channel is complete, then it returns to verifying the current channel allocation in step 606. This completes the data formatting operation.

The CHCHGOK 146 signal is first generated by being in last or next to last frame. CHCHGACK 142 comes back from the microcontroller 54 to verify the signal was received and the new VCID has been determined. The VCID may be the same if allocation not used. This resets CHCHGOK 146. After a new packet has started to be received by the Master Input EPLD, the CHCHGOK can activate any time it determines that it is the last or next to last frame. This allows for frame fill in a frame after the end of a packet. The frame fill is thrown out in the demultiplexer at the ground station detected by a VCID of 0x00. The frame fill is not sent to any demultiplexer channel. Operation of the demultiplexer is described in more detail below.

The Master Input EPLD allows the channel change (CHCHGOK) (CHCHGOK produced by: packet has started to be read by Master input EPLD, in last frame (complete or partial) or next to last frame (complete frame) from this packet (determined by PACKSIZE 148 (internal Master input EPLD variable) and frame size), or doing fill frames). For the VCID to change, the microcontroller 54 has to have also counted down to the last frame or next to last frame of this channel allocation by way of DECFRMRD 150 from the Master Input EPLD. This is required in addition to CHCHGOK to allow the microcontroller 54 to determine the number of packet filled frames to send by way of the statistical algorithm. The VCID remains the same otherwise. If the microcontroller 54 receives CHCHGOK and has determined that there are no more frames available, the VCID goes to 0x00. The Master Input EPLD produces frame fill to finish off the current frame and produces fill frames until frames are available again. It will be common for the first header pointer to point to the start of fill data in the middle of a frame. The corresponding VCID for that frame will be 0x00.

Figure 5A:
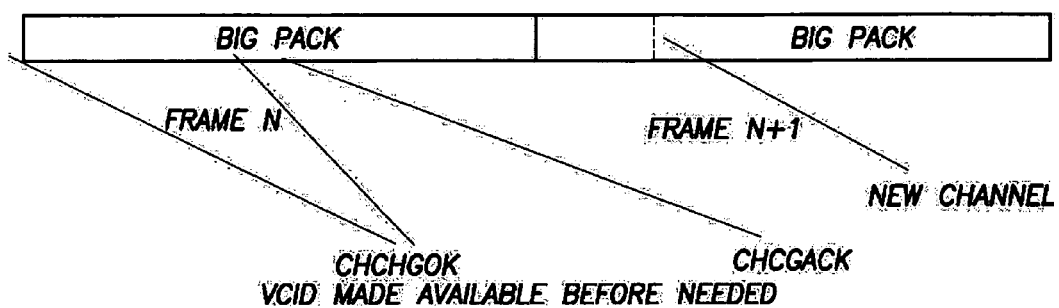
FIG. 5A is a frame diagram to illustrate a handshake operation of the invention.

With this background in mind, the handshaking will be as illustrated, with reference also to FIG. 5A. The minimum packet size is 233 bytes to ensure a frame boundary is always crossed for each packet. Maximum packet size is 4096 bytes.

In a signal exchange scenario, at powerup, VCID=0. The microcontroller 54 polls the various channels using CHACTIVE to determine if channel is active or not. Channel bitrate allocation is determined, allocation table produced, CONFERRSs sent as required. Channel receiving CONFERR is blocked by the microcontroller 54 until acceptable channel allocation is indicated. Next, all input buffers are reset by RSTMEM. The microcontroller 54 verifies current channel settings using CONFCHG. If no change, the microcontroller 54 proceeds to determine the number of frames to be sent. If change and channel not active, RSTMEM, the microcontroller 54 proceeds to verify current channel allocation. If change and channel active, if not supportable, RSTMEM, then verify current channel allocation. If supportable, RSTMEM, proceed to determine number of frames to be sent.

The microcontroller 54 then selects a channel by way of FRMRDY and determines number of frames to be sent. The VCID from the microcontroller 54 is sent to the master input EPLD and CHCHGACK is sent. Next, the master input EPLD creates master input ADDR from VCID. The microcontroller 54 reads (MIPKDATARD) channel FIFO starting at frame location indicated by first header pointer. The master input EPLD sends DECFRMRD at end of each frame (at start of R-S parity time). It allows channel change at end of packets—CHCHGOK. If the microcontroller 54 determines that current channel is not complete, VCID remains the same. It then returns to send the VCID from the microcontroller 54 to the master input EPLD. If the microcontroller 54 determines that current channel is complete, it returns to verify current channel settings.

Various Data Format Processes

For CCSDS packet channels, packet size is loaded into Master input EPLD and decremented until less than the frame data size ×2, then Master input EPLD sends CHCHGOK. CHCHGOK activated (after new packet start or fill frame, and last or next to last frame) to indicate ok for the microcontroller 54 to change channels. The microcontroller 54 determines whether to keep current VCID or search for next channel based on Number of Frames ready (NUMFRMRDY) received at beginning of this cycle's current channel time and channel allocation for this channel. CHCHGACK sent when VCID is ready for Master input EPLD.

For Bit Stream channels, CHCHGACK sent as normal when Bit Stream Channel is selected. CHCHGOK is asserted early into the Bit Stream downlink time period by Master input EPLD. The number of frames ready is loaded into the microcontroller 54 and decremented until less than the frame data size ×1. New channel determined by the microcontroller 54 and CHCHGACK sent.

For the 1394 channel (channel 3), the master input EPLD loads a frame ready number into its packet counter and decrements this packet counter as in the CCSDS packet case. CHCHGOK is set for the same case as CCSDS packets. This process is repeated until the 1394 FRMRDY signal is no longer active indicating the last 1394 packet is being processed. All 1394 data that is available (complete frames) are sent when this channel is selected. Data is continued to be sent until channel indicates frames are no longer ready (meaning 1394 packets no longer available). The microcontroller 54 determines new channel and sends CHCHGACK.

Simultaneously in addition to operation described above, the channel EPLD resets FIFOs when FIFOs have underflowed or overflowed and channel is not locked by the microcontroller 54 (means channel is being read). The signal RSTMEM is sent to Master input EPLD to start sending frame fill and fill frames and to the microcontroller 54 to initiate a new polling of channels. This action resets the FIFOs and starts a new search for channels with available data. A channel is not reset while locked; it waits until unlocked to reset.

For fill frame cases, a packet ends right at frame boundary. If VCID=0x00, a fill frame is produced. If a packet ends before frame boundary, and if VCID=0x00, then frame fill finishes off the frame.

The following descriptions refer to the various signal lines shown in FIG. 5.

CHACTIVE—Channel is currently active.
CHCHGACK—Acknowledgment of CHCHGOK signal. Sent after CHCHGOK accepted. Means correct VCID is being supplied by 8051 to Master input EPLD.
CHCHGOK—Ok to search for next VCID, occurs at end of packet read by Master input EPHD. CHLOCK—Signal from 8051 to Input Channel, means channel is being read do not flush buffer.
CONFCHG—Channel's configuration has changed (e.g. requested rate, active or not, format (STS vs. SS, CCSDS vs. bitstream)).
DECFRMRD—Activated at beginning of R-S parity time by Master input EPLD at the end of each frame. Qualified in 8051 by determining if on last or next to last frame from current channel allocation.
FRMRDY—Complete packets and enough for at least one frame.
NUMFRMRDY—Number of frames ready (Frame boundaries crossed). MIPKDATARD—Master input common read signal to all channels.
MIRSTCH—Sent from MIEPLD to channel when packet boundary error has been detected. Uses bit 9 to detect.
RQSTRATE—5 bits. MSB indicates if rate being requested based on APID. If bit 4 is 1, the packet source is requesting a rate. If bit 4 is a 0 it is not.
RSTCH—From 8051 to channel. Clears buffer/FIFO & starts new acquisition. Activated when channel configuration being changed.
RSTMEM—Signal from channel to 8051 & MIEPLD. Indicates memory being reset due to buffer overflows, detected protocol errors, etc. Cleared by 8051 reading.
VCID—Identifies channel to be serviced/started in next frame by way of VCID field in frame header and start of packet by First Header Pointer.
Bit 9 of Channel Input FIFO—Bit 9 high for first byte of packet. Indicates packet boundary. Used by Channel Input EPLD to produce FRMRDY by incrementing for each incoming packet and decrementing for each out going packet. Thus being able to indicate if there are any packets ready or not. Used by Master Input EPLD to find packet size for CCSDS packets and to validate packets by comparing packet size (count down) to when Bit 9 toggles.

In summary, only one VCID channel change per frame is allowed. Frame fill may be created from a VCID of 0x00. The allocation given to each channel is produced by allowing 0 to 255 frames per poll per channel. (0=no allocation for this channel). The encoder or other input source can request a rate if they produce an APID for a source that does rate selection/request. The 5 bit number is used with a lookup table in the microcontroller to determine the rate. For example: 10101 (6 Mbps) translates to 6/48*255=31.875=>32 frames per poll, (Not counting. framing overhead). The microcontroller adds up all rates and makes sure they don't exceed 255 total. CONFERR is used to facilitate this action.

The ground based demultiplexer starts new packets based on Data Boundary Pointer (First Header Pointer) in frame header. It ends packets based on packet size located in packet header. Partial frame with frame fill will not pass frame fill to any channel. Amount of data transferred to each output channel is based on packet sizes indicated in packet header. Only passes the length of data specified. Fill frame data after that point is discarded. The demultiplexer throws out frame fill and fill frames, and buffers up complete packet prior to sending to user to allow for packet dropping if a frame error is detected in the middle of the received packet.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A method of multiplexing data onto a common bus from a plurality of data channels, comprising the steps of:
   a. first allocating a predetermined number of data frames to each of the plurality of data channels for access to the bus;
   b. polling the plurality of data channels in turn for access to the bus, thereby defining a polling cycle;
   c. determining which of the plurality of data channels is active and nonactive, for each polling cycle;
   d. determining a requested allocation of data frames from each active plurality of data channels based on a predetermined priority order, for each polling cycle;
   e. comparing the requested allocation of data frames for each active plurality of data channels and the total number of allocated data frames, for each polling cycle;
   f. determining if each of the active channel's requested allocation of data frames can be accommodated based on a statistical analysis of the results from the comparing step during the current polling cycle and the predetermined priority order, wherein the determining step identifies any data frames that can be reallocated from any nonactive data channel;
   g. for each polling cycle, if there are any nonaccommodated active channels, wherein a nonaccommodated active channel is an active channel wherein its requested allocation of data frames cannot be accommodated, and there are data frames that can be reallocated from any nonactive data channel, reallocating any unused data frames amongst any nonaccommodated active channels based on a statistical analysis and the predetermined priority order.

2. The method of claim 1, wherein the plurality of data channels comprises a plurality of channels of a first data type and a parallel channel of a second data type.

3. The method of claim 2, wherein the second data type comprises video and audio data packets.

4. The method of claim 2, wherein the first data type comprises CCSDS data packets or bit stream service, the second data type comprises IEEE 1394 video data packets, and further comprising the step of providing a higher priority on the common bus to the second data type than to the first data type, wherein CCSDS packets vary in size from 233 to 4096 bytes.

5. The method of claim 2, further comprising the step of retaining data packets of the second data type in the parallel channel's respective buffer.

6. The method of claim 1, wherein the plurality of data channels is comprised of a plurality of channels of the first data type and a parallel channel of a second data type, wherein the step of determining a requested allocation is comprised of:
   determining a requested allocation for each of the plurality of channels of the first data type;
   determining a requested allocation for the parallel channel;
and further comprising the steps of:
   providing a plurality of buffers operably connected to the common bus and a plurality of channel controllers, wherein each of the plurality of channel controllers is operably connected to a respective buffer from the plurality of buffers, wherein the each of the plurality of channel controllers is operably connected to a respective data channel from the plurality of data channels, wherein each of the plurality of channel controllers are in two-way communication with each of the respective buffer and data channel and controls the flow of data between the respective data channel and buffer;
   providing a receiver and a transmitter for each of the plurality of data channels;
   providing a TAXI receiver for each of the plurality of data channels, wherein each TAXI receiver is operably connected to a respective receiver for each of the plurality of data channels;
   providing a TAXI transmitter for each of the plurality of data channels, wherein each TAXI transmitter is operably connected to a respective transmitter for each of the plurality of data channels;
   for each polling cycle, ensuring, through appropriate first commands, that the parallel channel achieves its entire requested allocation for each of the polling cycles by granting the parallel channel the highest priority in the predetermined priority order; and
   for each polling cycle, controlling the flow of data for each of the plurality of channels of the first data type comprising the following steps:
      for each of the plurality of buffers, if a buffer reaches a first predetermined data frame fullness level, ensuring through a second command sent from the buffer to the respective channel controller that the respective channel controller pauses the flow of data from the respective channel controller to the respective buffer;
      for each of the plurality of buffers, if a buffer reaches a second predetermined data frame fullness level, ensuring through a third command that the respective channel controller resets the memory of the respective buffer;
      ensuring through a fourth command that if a buffer reaches a third predetermined data frame fullness level and the respective channel controller has been either paused or its memory reset, the flow of data to the buffer is opened.

7. A method of multiplexing data onto a common bus from a plurality of data channels, comprising the steps of:
   providing a digital data multiplexer comprising:
      the common bus;
      an output serial data interface operatively coupled to receive data from the common bus and having a predetermined bandwidth;
      a plurality of channels of a first data type operatively coupled to provide data to the common bus, wherein each of the plurality of channels is comprised of a dedicated channel controller capable of receiving commands and controlling data flow;
      a parallel channel of a second data type operatively coupled to provide data to the common bus; and
      a microcontroller capable of controlling access of the plurality of channels and the parallel channel to the common bus in accordance to the predetermined bandwidth on a statistical basis for a plurality of polling cycles;
   allocating a predetermined number of frames for each of the dedicated channel controllers for each polling cycle, wherein the allocation is performed by the microcontroller;
   polling the plurality of dedicated channel controllers;
   determining which of the plurality of channels is active;
   determining a requested allocation of frames for each active plurality of channels;
   determining if each of the active channels' requested allocation of frames can be accommodated comprising the steps of:
      comparing the predetermined number of allocated frames and the requested allocation of frames;
      determining how many available frames each of the plurality of channels has during the current cycle; and
   reallocating any available frames amongst the plurality of channels using a statistical allocation process and a predetermined priority order, wherein the step of reallocating is performed by both the microcontroller via commands and the plurality of channel controllers.

8. The method of claim 7, wherein the first data type comprises CCSDS data packets or bit stream interface, wherein CCSDS data packets vary in size from 233 to 4096 bytes.

9. The method of claim 7, wherein the second data type comprises video and audio data packets.

10. The method of claim 7, wherein:
    the first data type comprises CCSDS data packets or bit stream service;
    the second data type comprises IEEE 1394 video and audio data packets; and
    the microcontroller provides a higher priority on the common bus to the second data type as opposed to the first data type.

11. The method of claim 7, wherein the microcontroller provides access for the plurality of channels and the parallel channel to the common bus in the plurality of polling cycles, and wherein the period of time for access to the common bus for the plurality of channels and the parallel channel varies with each polling cycle.

12. The method of claim 11, further comprising a buffer memory retaining data packets of the second data type.

13. The method of claim 12, wherein the buffer memory retaining data packets of the second data type is read out onto the data bus during each polling cycle.

14. The method of claim 7, wherein the digital data multiplexer further comprises a master input logic device operably coupled between the microcontroller and the common bus.

15. The method of claim 14, wherein the microcontroller operates asynchronously with the data bus and the master input logic device operates synchronously with the common bus.

16. The method of claim 15, further comprising the step of transmitting status information of the digital data multiplexer and the incoming multiplexed data sources.

17. The method of claim 16, wherein the digital data multiplexer is capable of transmitting IEEE 1394, IEC 61883 packets over large distances such as using a satellite link.

18. The method of claim 7, further comprising the steps of:

determining a parallel channel requested allocation for the parallel channel for each polling cycle; and ensuring that the parallel channel achieves the parallel channel requested allocation for each of the plurality of polling cycles by granting the parallel channel the highest priority in the predetermined priority order.

19. The method of claim 7, further comprising the step of:

blocking transmission from at least one plurality of channels if the reallocating step is unable to reallocate any available frames for the at least one plurality of channels.

* * * * *